United States Patent [19]

Antonio et al.

[11] Patent Number: 5,182,633
[45] Date of Patent: Jan. 26, 1993

[54] VIDEO SAMPLE RATE CONVERTER

[75] Inventors: Robert C. Antonio, San Carlos; Phillip P. Bennett, Portola Valley; Mark R. Andrews, Foster City, all of Calif.

[73] Assignee: Abekas Video Systems, Inc., Redwood City, Calif.

[21] Appl. No.: 684,591

[22] Filed: Apr. 12, 1991

[51] Int. Cl.[5] .................... H04N 7/01; H04N 11/02
[52] U.S. Cl. ................................. 358/11; 358/140; 358/183; 358/22
[58] Field of Search .............. 358/140, 133, 138, 135, 358/136, 11, 214, 183, 181, 182, 22; 364/724.1; 382/42

[56] References Cited

U.S. PATENT DOCUMENTS

| | | | |
|---|---|---|---|
| 4,837,723 | 6/1989 | Peacock | 364/724.1 |
| 4,979,022 | 12/1990 | Snashall et al. | 358/22 |
| 4,991,010 | 2/1991 | Hailey et al. | 358/140 |
| 5,057,911 | 10/1991 | Stec et al. | 358/11 |
| 5,079,734 | 1/1992 | Riley | 364/724.1 |

FOREIGN PATENT DOCUMENTS

0423921A3  4/1999  European Pat. Off.

Primary Examiner—James J. Groody
Assistant Examiner—Michael H. Lee
Attorney, Agent, or Firm—Limbach & Limbach

[57] ABSTRACT

A video sample rate converter for converting decoded SMPTE D2 interleaved component video to SMPTE D1 interleaved component video includes a single modified multi-tap finite impulse response ("FIR") digital filter which alternately functions as a data selector and two-point linear interpolator, and as a four-point polyphase interpolator. The FIR filter uses time variant switched filter coefficients and a selectively inhibited output clock signal.

23 Claims, 17 Drawing Sheets

FIG. 2

```
<< Contents of C0 rom >>                                              ASCII
                                                                      REPRESENTATION
00000:  07 00 0F FF 16 FE 1D FC 24 FA 2C F8 33 F6 3A F3   ........$.,.3.:.
00010:  41 F2 49 F1 50 F0 57 F1 5E F3 66 F5 6D F7 74 FB   A.I.P.W.^.f.m.t.
00020:  7B FE 00 00 00 00 00 00 0F FF 00 FD 00 F7 00 F7   {...............
00030:  00 F5 00 F3 00 F1 00 F0 00 FC 00 F2 00 FC 00 F6   ................
00040:  00 F9 00 FC 00 07 00 00 16 FE 1D FC 24 FA 2C FA   ............$.,.
00050:  2C F8 33 F6 3A F3 41 F2 49 F1 50 F0 57 F1 5E F3   ,.3.:.A.I.P.W.^.
00060:  66 F5 6D F7 74 FB 7B FE 00 00 00 00 00 00 00 FD   f.m.t.{.........
00070:  00 FC 00 F9 00 F4 00 F0 00 F5 00 F9 00 FF 00 F0   ................
00080:  00 F2 00 F4 00 F6 00 FC 00 F3 00 F6 00 0F 00 FF   ................
00090:  16 FE 1D FC 24 FA 2C F8 33 F6 3A F3 41 F2 49 F1   ....$.,.3.:.A.I.
000A0:  50 F0 57 F1 5E F3 66 F5 6D F7 74 FB 7B FE 00 00   P.W.^.f.m.t.{...
000B0:  00 00 00 FF 00 F1 00 F3 00 FD 00 F0 00 F5 00 F3   ................
000C0:  00 F1 00 00 0F FF 16 FE 1D FC 24 FA 2C F8 33 F6   ..........$.,.3.
000D0:  3A F3 41 F2 49 F1 50 F0 57 F1 5E F3 66 F5 6D F7   :.A.I.P.W.^.f.m.
000E0:  74 FB 7B FE 00 00 00 00 00 00 0F FF 00 FD 00 FC   t.{.............
000F0:  00 F7 00 F6 00 FA 2C FA 2C F8 33 F6 3A F3 41 F2   ......,.,.3.:.A.
00100:  00 F6 00 F4 00 F2 00 FE 00 F0 00 FF 00 F1 00 F2   ................
00110:  00 00 00 00 00 00 00 F1 00 00 00 00 00 00 00 FE   ................
00120:  24 FA 2C F8 33 F6 3A F3 41 F2 49 F1 50 F0 57 F1   $.,.3.:.A.I.P.W.
00130:  5E F3 66 F5 6D F7 74 FB 7B FE 00 F3 00 FC 00 F1   ^.f.m.t.{.......
00140:  00 FD 00 F0 00 F7 00 F6 00 F9 00 F3 00 FC 00 00   ................
00150:  00 F0 00 F0 00 F4 00 F9 00 F8 00 F5 00 FC 00 F1   ................
00160:  0F FF 16 FE 1D FC 24 FA 2C F8 33 F6 3A F3 41 F2   ......$.,.3.:.A.
00170:  49 F1 50 F0 57 F1 5E F3 66 F5 6D F7 74 FB 7B FE   I.P.W.^.f.m.t.{.
00180:  00 00 00 00 00 00 00 FF 00 FD 00 FB 00 F7 00 F5   ................
00190:  00 00 00 00 00 F3 00 F1 00 F2 00 F6 00 FA 2C F9   ..............,.
001A0:  00 F3 00 FC 00 F3 00 F6 00 FC 00 F2 00 FE 00 F8   ................
001B0:  33 F6 3A F3 41 F2 49 F1 50 F0 57 F1 5E F3 66 F5   3.:.A.I.P.W.^.f.
001C0:  6D F7 74 FB 7B FE 00 F7 00 F6 00 FD 00 FC 00 FC   m.t.{...........
001D0:  00 00 F9 00 F4 00 F2 00 F9 00 F0 00 F1 00 F0 F2   ................
001E0:  00 00 00 F4 00 00 F6 00 F9 00 FC 00 07 00 FF FE   ................
```

| | | | | | | | | | |
|---|---|---|---|---|---|---|---|---|---|
| 005F0: | 00 | F1 | F3 | 00 | F1 | 00 | F2 | F4 | 00 | F6 | 00 | F9 | ........ |
| 00600: | 00 | 00 | FC | 00 | 07 | 00 | FF | FE | 1D | FA | 2C | F8 | ........ |
| 00610: | 33 | F6 | F6 | 3A | F3 | 41 | F2 | F0 | 57 | F1 | 66 | F5 | 3.:.A.I.P.W.^.f. |
| 00620: | 6D | F7 | F7 | 74 | FB | 7B | FE | F0 | 00 | 5E | 00 | FC | m.t.(....^.. |
| 00630: | 00 | F9 | F9 | 00 | 00 | 00 | 00 | 00 | 00 | 00 | 00 | F2 | ........ |
| 00640: | 00 | F4 | F4 | 00 | 00 | 00 | 00 | 0F | 00 | 0F | 16 | F0 | ........ |
| 00650: | 1D | FC | FC | 24 | 2C | F8 | F3 | FF | F1 | FF | 50 | FE | ...$,.....P. |
| 00660: | 57 | F1 | F1 | 5E | 66 | F5 | FD | F1 | 49 | F1 | F0 | F0 | W.^.f...I... |
| 00670: | 00 | FF | FF | 00 | 00 | 00 | F0 | F2 | 00 | F2 | 00 | 00 | ........ |
| 00680: | 00 | F1 | F1 | 00 | 00 | 00 | F6 | FE | 00 | FE | 00 | F1 | ........ |
| 00690: | 07 | 00 | 00 | 0F | 16 | FE | FA | F5 | 3A | F5 | 00 | 00 | .....:.. |
| 006A0: | 41 | F2 | F2 | 49 | F1 | F0 | 2C | FC | 33 | FC | 3A | F3 | A.I.P.,.3.:. |
| 006B0: | 7B | FE | FE | 00 | 00 | 00 | 66 | F5 | 6D | F5 | F3 | FB | {.....f.m... |
| 006C0: | 00 | F5 | F5 | 00 | 00 | 00 | F3 | FC | 00 | FC | F3 | F7 | ........ |
| 006D0: | 00 | F9 | F9 | 00 | 00 | 00 | F6 | F0 | 00 | F0 | F9 | F6 | ........ |
| 006E0: | 2C | F8 | F8 | 33 | F6 | 3A | F3 | FF | 41 | FF | F4 | FA | ,...3.:...A..... |
| 006F0: | 66 | F5 | F5 | 6D | F7 | 74 | FB | 00 | 7B | 00 | FC | F3 | f.m.t.(....... |
| 00700: | 00 | FC | FC | 00 | 00 | 00 | F7 | F1 | 00 | F1 | FC | FD | ........ |
| 00710: | 00 | F2 | F2 | 00 | 00 | 00 | F6 | FF | 00 | FF | FE | F0 | ........ |
| 00720: | 16 | FE | FE | 1D | FC | 24 | FA | 00 | F2 | 00 | F0 | F0 | ...$,...... |
| 00730: | 50 | F0 | F0 | 57 | F1 | 5E | F3 | 00 | 49 | 00 | FE | FF | P.W.^.I... |
| 00740: | 00 | 00 | 00 | 00 | 00 | 00 | FB | F5 | 00 | F5 | 00 | F1 | ........ |
| 00750: | 00 | F1 | F1 | 00 | 00 | 00 | F7 | FC | 00 | FC | 00 | 00 | ........ |
| 00760: | 00 | 00 | 00 | 00 | 0F | 16 | F6 | F5 | FA | F5 | 33 | F3 | .......$..,.3 |
| 00770: | 3A | F3 | F3 | 41 | F2 | 49 | F1 | 00 | 2C | 00 | F6 | FD | :.A.I.P..,.. |
| 00780: | 74 | FB | FB | 7B | FE | F0 | FD | 00 | 66 | 00 | F0 | F0 | t.(....f... |
| 00790: | 00 | F7 | F7 | 00 | F3 | 00 | F0 | FF | 00 | FF | FF | FF | ........ |
| 007A0: | 00 | F6 | F6 | 00 | 00 | 00 | F5 | F1 | 00 | F1 | F1 | F1 | ..$..3..A.I.P.W. |
| 007B0: | 24 | FA | FA | 2C | F8 | 33 | F6 | FE | 3A | FE | 50 | FC | $,.3.:.A.I.P. |
| 007C0: | 5E | F3 | F3 | 66 | F5 | 6D | F7 | F0 | 74 | F0 | 57 | F1 | ^.f.m.t.(.... |
| 007D0: | 00 | 00 | 00 | 00 | 00 | 00 | F5 | FC | 00 | FC | 00 | FF | ........ |
| 007E0: | 00 | FD | FD | 00 | F3 | 00 | FC | F1 | 00 | F1 | 07 | 00 | ........ |
| 007F0: | 0F | FF | FF | 16 | FE | F6 | F0 | F2 | 3A | F2 | 41 | F2 | .....$..3..A. |

FIG. 2 (CONTINUED)-D

```
<< Contents of C1 rom>>                                                          ASCII
                                                                                 REPRESENTATION
00000:  00 04 00 09 00 10 00 18 00 21 00 2C 00 38 00 44  .........!.,.8.D
00010:  00 50 00 5B 00 66 00 07 00 79 1D 28 27 2F 69 7D  .P.[.f...y.('/2
00020:  00 7F 04 02 0B 45 7F 7F 00 04 60 0C 6E 18 00 21 .....[email protected]!
00030:  36 3E 4A 7F 7F 00 04 50 7F 7F 00 04 50 00 00 7B  6>>JEWL`Sk[rbwi(
00040:  70 7E 78 00 38 7D 00 44 7D 00 38 00 18 00 21 .. p~x..8}.D}.8..!
00050:  00 2C 00 38 7D 00 2F 69 7D 32 7B 70 36 00 14     .,.8}.D.[.f.n.s
00060:  00 79 00 7D 00 2F 69 7D 2F 69 7D 32 7B 70 00 6B  .y.}.(./26>>JEWL`Sk
00070:  21 1D 28 27 2F 69 7D 2F 69 7D 32 7B 70 00 6B    !.('/26>>JEWL`Sk
00080:  5B 72 62 77 18 00 6E 0C 60 04 00 50 00 7F 04 09 [rbwi(p~x......[
00090:  00 10 00 18 00 21 00 2C 00 38 00 44 7D 00 5B    .....!.,.8.D...[
000A0:  00 66 00 6E 0C 60 04 00 50 00 7F 04 3E 78 7F 02 .f.n.s......>x.
000B0:  0B 07 12 4C 00 09 5B 00 5B 00 21 00 73 14 4A 7F ....!..s......J
000C0:  45 57 4C 60 00 50 00 7F 04 00 44 7D 00 36 3E 7F EWL`Sk[rbwi(p~x.
000D0:  7F 7F 00 04 50 00 7F 04 00 7D 00 36 70 7E 78 38 ....!...8
000E0:  00 44 7D 00 44 7D 00 2C 00 79 00 7D 2C 00 7D    .D.P.[.f.n.s.y.
000F0:  00 7D 00 44 7D 00 2F 69 7D 32 7B 70 21 1D 28 27 ).......!.('
00100:  2F 32 7B 70 7B 5B 72 00 21 21 5B 72 62 77 18   /26>>JEWL`Sk[rbw
00110:  69 7B 70 7E 78 2C 00 79 00 00 10 00 66 00 00 6E i(p~x...
00120:  00 21 00 2C 00 38 7D 00 7D 00 5B 02 0B 07 00 6E .!.,.8.D.[.f.n
00130:  00 73 00 00 79 00 7D 00 44 7D 00 2C 00 79 4C 60 .s.y.).
00140:  19 14 21 1D 28 27 2F 69 7D 2F 7F 7F 00 7F 7F 04 ..!.('/26>>JEWL`
00150:  53 6B 5B 72 62 77 18 00 6E 0C 60 04 00 50 00 04 Sk[rbwi(p~x..P
00160:  00 09 00 10 00 18 00 21 00 2C 00 38 00 44 00 50 .......!.,.8.D.P
00170:  00 5B 00 6E 00 00 73 1D 28 27 2F 69 7D 32 36 7F .[.f.n.s.(./26>
00180:  04 02 0B 45 7F 7F 00 44 7D 00 18 00 21 00 7E 2C ...D}.[.f.n
00190:  3E 4A 7F 7F 00 04 50 00 38 27 77 7B 70 00 2C    >JEWL`Sk[rbwi(p~
001A0:  78 7F 7F 00 38 00 44 7D 00 18 00 6E 0C 60 73 79 x..8}.D.[.f.n.s.y
001B0:  00 38 00 44 7D 00 44 7D 00 18 00 73 00 14 21 1D .8.D.P.[.f.n.s.!.
001C0:  00 7D 00 7D 00 2F 69 7D 2F 69 7D 32 7B 70 00 6B ).}.('/26>>JEWL`Sk[r
001D0:  28 27 2F 69 7D 32 7B 70 00 6B 00 00 73 6B 5B 72 ('/26>>JEWL`Sk[r
```

```
001E0: 62 77 69 7B 70 7E 7F 7F 44 7D 00 38 00 2C 00 10  bwi{p~..D}.8.,..
001F0: 00 18 00 21 00 00 00 00 00 00 00 00 00 00 66 07  ...!..........f.
00200: 00 6E 0C 19 14 21 2C 00 79 00 2F 00 2B 00 0B 07  .n...!,.y./.+...
00210: 12 0C 53 6B 5B 72 77 1D 00 28 27 69 2F 00 45 57  ..Sk[rw..('i/.EW
00220: 4C 60 00 00 00 18 00 6E 72 62 77 69 2F 7F 7F 7F  L`.....nrbwi/...
00230: 00 04 00 09 00 00 00 00 00 00 00 00 00 00 00 44  ...............D
00240: 00 50 00 5B 00 66 6E 0C 12 4C 60 00 18 00 38 00  .P.[.fn..L`...8.
00250: 00 7F 04 02 07 00 00 00 00 00 00 00 00 00 00 7D  ...............}
00260: 36 3E 4A 4A 57 7F 5B 5B 4C 60 04 00 50 00 7D 00  6>JJW.[[L`..P.}.
00270: 70 7E 78 7F 7F 7F 7F 7F 00 00 00 04 00 00 00 2F  p~x............/
00280: 00 2C 00 38 00 44 7F 7F 7F 7D 7E 7D 00 00 00 7D  .,.8.D...}~}...}
00290: 00 79 00 7D 00 00 00 2C 00 79 00 79 00 7D 00 21  .y.}...,.y.y.}.!
002A0: 21 1D 28 27 2F 2F 2F 2F 2F 2F 2F 2F 2F 00 00 14  !.('/////////...
002B0: 5B 72 62 77 77 69 69 69 32 32 32 32 32 27 28 6B  [rbwwiii22222'(k
002C0: 00 10 00 18 00 10 00 10 10 10 10 10 62 2F 00 21  ............b/.!
002D0: 00 66 00 6E 00 66 00 66 66 66 66 66 77 69 00 73  .f.n.f.fffffwi.s
002E0: 0B 07 12 0C 60 00 12 0C 00 04 00 00 7F 69 00 14  ....`........i..
002F0: 45 57 4C 60 00 38 4C 60 50 00 7D 00 69 2F 00 6B  EWL`.8L`P.}.i/.k
00300: 7F 7F 00 00 00 00 00 00 00 00 00 00 00 38 00 09  .............8..
00310: 00 44 00 50 00 00 00 00 79 00 79 00 2C 00 00 7D  .D.P....y.y.,..}
00320: 00 7D 00 7F 04 04 7F 7F 00 1D 28 27 1D 28 27 27  .}........('.('')
00330: 2F 32 36 3E 4A 4A 57 7F 21 14 21 62 62 62 5B 77  /26>JJW.!.!bbb[w
00340: 69 7B 70 7E 78 7F 7F 7F 5B 6B 5B 72 72 72 62 77  i{p~x...[k[rrrbw
00350: 00 21 00 00 00 00 00 00 00 09 00 10 10 10 00 18  .!.............
00360: 00 73 00 00 00 00 00 00 5B 00 5B 00 66 66 66 6E  .s......[.[.fffn
00370: 19 14 21 1D 28 27 2F 32 36 3E 4A 4A 57 4C 60 0C  ..!.('/26>JJWL`.
00380: 53 6B 5B 72 62 77 69 7B 70 7E 78 7F 7F 7F 00 04  Sk[rbwi{p~x.....
00390: 00 00 00 10 00 00 00 00 00 00 00 00 00 00 00 44  ...............D
003A0: 00 5B 00 66 00 0B 07 00 00 00 00 2F 00 38 00 7D  .[.f......./.8.}
003B0: 00 0B 00 12 0B 07 12 0C 2F 2F 2F 2F 2F 2F 2F 7F  ......../////////
003C0: 04 02 45 57 4C 60 36 3E 4A 57 7F 69 69 7B 70 7E  ..EWL`6>JW.ii{p~
003D0: 3E 4A 4A 57 7F 7F 7F 7F 00 21 00 00 00 00 2C 00  >JJW.....!....,.
```

FIG. 2 (CONTINUED) - F

```
003E0:  00 38 00 00 44 00 50 00 5B 00 66 00 6E 00 73 00 79    .8.D.P.[.f.n.s.y
003F0:  00 7D 00 7F 00 7D 00 7F 00 04 02 00 00 07 00 1D    .}.}.........}..}..!.
00400:  28 27 2F 69 32 36 3E 3E 4A 45 57 4C 60 53 6B 5B 72    ('/26>>JEWL`Sk[r
00410:  62 77 69 28 70 7E 78 00 2C 00 38 00 44 00 50 00 10    bwi(p~x.,.8.D.P..
00420:  00 18 00 21 00 2F 00 7D 00 7D 00 7D 00 66 00 66    ...!...8.D.P.[.f
00430:  00 6E 00 73 00 79 00 1D 00 21 00 28 00 2F 00 07    .n.s.y...!.('/26>>JEW
00440:  12 0C 19 14 21 1D 28 27 2F 69 32 36 3E 3E 4A 45 57    ....!.('/26>>JEW
00450:  4C 60 53 6B 5B 72 62 77 69 28 70 7E 78 00 7F 7F    L`Sk[rbwi(p~x...
00460:  00 04 00 09 00 18 00 00 6E 00 0C 00 12 00 00 38    .........n.....8.D
00470:  00 50 00 7F 00 04 50 00 7F 3E 4C 60 00 7D 00 7D    .P.[.f.n.s.y.).)
00480:  00 7F 04 02 0B 00 44 00 7D 00 04 00 00 2F 00 32    .........!('/2
00490:  36 3E 4A 4A 45 57 4C 60 53 6B 5B 72 62 77 69 28 70    6>>JEWL`Sk[rbwi(
004A0:  70 7E 78 00 7F 7F 00 44 00 7D 00 18 00 00 6E 00    p~x....!......!
004B0:  00 2C 00 38 00 38 70 7E 7E 78 00 2C 00 00 79 00 14    .,.8.D.P.[.f.n.s.
004C0:  00 79 00 7D 00 7D 00 7D 70 00 79 00 79 00 79 00 6B    .y.).).('/26>>JEWL`Sk
004D0:  21 1D 28 27 2F 69 32 36 3E 4A 4A 45 57 4C 60 53    !.('/26>>JEWL`S
004E0:  5B 72 62 77 69 28 70 7E 78 00 2C 00 38 00 70 7E    [rbwi(p~x.
004F0:  00 10 00 18 00 00 6E 00 0C 00 12 00 00 1D 00 7B    ...!...8.D.P.[
00500:  00 66 00 66 00 6E 00 73 00 79 00 1D 00 21 00 02    .f.n.s.y....!.
00510:  0B 07 00 12 0C 19 14 21 1D 28 27 2F 69 32 36 4A    .!.('/26>>J
00520:  45 57 4C 60 53 6B 5B 72 62 77 69 28 70 7E 78 00 7F    EWL`Sk[rbwi(p~x.
00530:  7F 7F 00 00 00 18 00 7D 00 2C 00 00 38 00 7D    ...!...8
00540:  00 44 00 44 00 50 00 7D 00 04 00 79 00 1D 00 7D    .D.P.[.f.n.s.y.)
00550:  00 7D 00 7F 00 7D 00 7F 00 10 00 28 00 27 00 7D    .)..!.('
00560:  2F 32 36 69 32 36 3E 3E 4A 45 57 4C 60 53 6B 5B 77    /26>>JEWL`Sk[rbw
00570:  69 28 70 7E 78 00 7F 7F 00 10 00 66 00 66 00 18    i(p~x.....!..8.D.P.[.f.n
00580:  00 21 00 7D 00 7D 00 2F 00 32 00 7B 00 00 12 0C    .!...8.D.P.
00590:  00 73 00 14 00 21 00 1D 00 1D 00 14 00 60 00    .s.y.).('/26>>JEWL`
005A0:  19 14 21 1D 28 27 2F 69 32 36 3E 4A 45 57 4C 00 60    ..!.('/26>>JEWL`
005B0:  53 6B 5B 72 62 77 69 28 70 7E 78 00 44 00 7D 00 04    Sk[rbwi(p~x.
005C0:  00 09 00 5B 00 5B 00 10 00 18 00 66 00 00 12 00    ...!.('/26>>JEWL`Sk[rbwi(p~x.
005D0:  00 5B 00 0B 00 00 00 45 00 7F 00 44 00 7D 00 7F    .[.f.n.s.y.)
005E0:  04 02 0B 00 2F 2F 2F 2F 32 36 32 32 36 3E    .('/26>
```

FIG. 2 (CONTINUED)—G

```
005F0:  3E 4A 45 57 4C 60 53 6B 5B 72 62 77 69 7B 70 7E   >JEWL`Sk[rbwi{p~
00600:  78 7F 7F 00 04 00 00 09 00 10 00 18 00 21 00 2C   x............!.,
00610:  00 38 00 44 7D 00 50 7F 5B 00 66 00 6E 0C 73 00 79   .8.D}.P.[.f.n.s.y
00620:  00 7D 00 2F 32 36 3E 04 02 0B 07 12 1D 21 00 1D   .}./26>......!..
00630:  28 27 2F 69 7B 70 7E 78 4A 45 57 4C 60 53 6B 5B 72   ('/26>>JEWL`Sk[r
00640:  62 77 69 7B 70 7E 78 7F 7F 00 04 00 00 09 00 10   bwi{p~x.........
00650:  00 18 00 21 00 2C 00 38 00 44 7D 00 50 7F 5B 00 66   ...!.,.8.D}.P.[.f
00660:  00 6E 0C 73 00 79 00 7D 00 2F 32 36 3E 04 02 0B 07   .n.s.y.}./26>....
00670:  12 0C 19 14 21 00 1D 28 27 2F 69 7B 70 7E 78 4A 45 57 4C   ....!.('/26>>JEW
00680:  4C 60 53 6B 5B 72 62 77 69 7B 70 7E 78 7F 7F 7F   L`Sk[rbwi{p~x..
00690:  00 04 00 00 09 00 10 00 18 00 21 00 2C 00 38 00 44   ..........!.,.8.D
006A0:  00 50 00 7F 04 02 0B 07 12 0C 19 14 21 00 1D 28 27 7D 00   .P.........!..}.
006B0:  00 7F 04 02 0B 07 12 0C 19 14 21 00 1D 28 27 2F   .........!..('/
006C0:  36 3E 4A 45 57 4C 60 53 6B 5B 72 62 77 69 7B 7B   6>>JEWL`Sk[rbwi{
006D0:  70 7E 78 7F 7F 00 04 00 00 09 00 10 00 18 00 21   p~x..........!
006E0:  00 2C 00 38 00 44 00 50 00 7F 04 02 0B 07 12 0C 19 73   .,.8.D.P........s
006F0:  00 79 00 7D 00 2F 32 36 3E 04 02 0B 07 12 0C 19 14   .y.}./26>......
00700:  21 00 1D 28 27 2F 69 7B 70 7E 78 4A 45 57 4C 60 53 6B   !..('/26>>JEWL`Sk
00710:  5B 72 62 77 69 7B 70 7E 78 7F 7F 00 04 00 00 09   [rbwi{p~x........
00720:  00 10 00 18 00 21 00 2C 00 38 00 44 00 50 00 7F   .....!.,.8.D.P.
00730:  00 66 00 6E 0C 73 00 79 00 7D 00 2F 32 36 3E 04 02   .f.n.s.y.}./26>..
00740:  0B 07 12 0C 19 14 21 00 1D 28 27 2F 69 7B 70 7E 78 3E   .......!..('/26>>J
00750:  45 57 4C 60 53 6B 5B 72 62 77 69 7B 70 7E 78 4A 7F   EWL`Sk[rbwi{p~x.
00760:  7F 7F 00 04 00 00 09 00 10 00 18 00 21 00 2C 00 38   ............!.,.8
00770:  00 44 7D 00 50 7F 5B 00 66 00 6E 0C 73 00 79 00 7D   .D}.P.[.f.n.s.y.}
00780:  00 7D 00 2F 32 36 3E 04 02 0B 07 12 0C 19 14 21 27   .}./26>......!'
00790:  2F 69 7B 70 7E 78 4A 45 57 4C 60 53 6B 5B 72 62 77   /26>>JEWL`Sk[rbw
007A0:  69 7B 70 7E 78 7F 7F 00 04 00 00 09 00 10 00 18   i{p~x...........
007B0:  00 21 00 2C 00 38 00 44 00 50 00 66 00 6E 0C 73 00   .!.,.8.D.P.f.n.s.
007C0:  79 00 7D 00 2F 32 36 3E 04 02 0B 07 12 0C   .y.}./26>>JEWL`
007D0:  00 73 00 79 00 7D 00 2F 32 36 3E 04 02 0B 45 57 4C 60   .s.y.}./26>>JEWL`
007E0:  19 14 21 00 1D 28 27 2F 69 7B 70 7E 78 4A 45 57 4C   ...!..('/26>>JEWL`
007F0:  53 6B 5B 72 62 77 69 7B 70 7E 78 7F 7F 00 04   Sk[rbwi{p~x....
00800:  00 09 00 10 00 18 00 21 00 2C 00 38 00 44 00 50   .......!.,.8.D.P
```

FIG. 2 (CONTINUED)-H

<< Contents of C2 rom >>

| Address | Hex Data | ASCII REPRESENTATION |
|---|---|---|
| 000000: | 78 7F 70 7E 69 7B 62 77 5B 72 53 6B 4C 60 45 57 | x.p~i{bw[rSkL`EW |
| 000010: | 3E 4A 36 3E 2F 00 7D 00 7D 28 32 1D 19 00 0B 07 | >J6>/.}.}(2.... |
| 000020: | 04 02 00 7F 00 50 00 44 00 7D 00 79 00 2C 00 66 | .....P.D.}.y.,.f |
| 000030: | 00 5B 00 00 00 00 00 38 00 00 00 2C 00 00 00 10 | .[.....8...,.... |
| 000040: | 00 09 00 04 00 00 78 7F 7F 4A 02 00 78 7F 00 72 | ......x..J..x..r |
| 000050: | 53 6B 4C 60 45 57 3E 4A 36 3E 4A 02 00 5B 1D 00 | SkL`EW>J6>J..[.. |
| 000060: | 19 14 12 0C 0B 00 66 00 5B 00 09 00 00 00 00 79 | ......f.[......y |
| 000070: | 00 73 00 6E 00 18 00 10 00 00 00 5B 00 00 00 2C | .s.n.......[...., |
| 000080: | 00 21 00 00 00 18 00 6E 00 6E 00 10 00 00 00 7E | .!.....n.n.....~ |
| 000090: | 69 7B 62 77 5B 72 1D 00 79 00 2C 00 66 00 00 3E | i{bw[r..y.,.f..> |
| 0000A0: | 2F 32 28 27 5B 21 00 7D 00 7D 00 2C 00 7E 00 7F | /2('[.}.}.,.~.. |
| 0000B0: | 00 7D 00 7D 00 00 00 2C 00 7E 00 3E 00 7F 00 50 | .}.}...,.~.>...P |
| 0000C0: | 00 44 00 38 00 7F 7F 7F 4A 02 00 5B 00 09 00 04 | .D.8....J..[.... |
| 0000D0: | 00 00 00 78 7F 7F 4A 02 00 78 7F 00 7E 3E 4C 60 | ...x..J..x..~>L` |
| 0000E0: | 45 57 3E 4A 36 00 7F 00 50 00 7F 62 28 27 7B 0C | EW>J6...P..b('{. |
| 0000F0: | 0B 07 04 02 00 5B 00 00 00 09 00 21 00 73 00 6E | .....[.....!.s.n |
| 000100: | 00 66 00 10 00 00 00 2C 00 7E 00 7E 69 7B 62 77 | .f.....,.~.~i{bw |
| 000110: | 00 10 00 00 00 00 00 38 00 44 00 7D 7B 32 28 27 | .......8.D.}{(2' |
| 000120: | 5B 72 53 6B 4C 60 45 57 3E 2F 00 7F 00 7D 00 7D | [rSkL`EW>/...}.} |
| 000130: | 21 1D 19 14 12 0C 0B 07 50 00 04 00 00 00 00 7D | !.......P......} |
| 000140: | 00 79 00 73 00 6E 00 18 00 10 00 04 00 00 00 38 | .y.s.n.........8 |
| 000150: | 00 2C 00 21 00 00 00 6E 00 5B 00 09 00 00 00 7F | .,.!...n.[...... |
| 000160: | 70 7E 69 7B 62 77 5B 72 53 6B 4C 60 45 57 3E 4A | p~i{bw[rSkL`EW>J |
| 000170: | 36 3E 2F 00 7D 00 7D 28 32 1D 19 00 0B 07 04 02 | 6>/.}.}(2....... |
| 000180: | 00 7F 00 50 00 44 00 7D 00 79 00 2C 00 66 00 5B | ...P.D.}.y.,.f.[ |
| 000190: | 00 00 00 00 00 38 00 00 00 2C 00 00 00 10 00 09 | .....8...,...... |
| 0001A0: | 00 50 00 44 00 00 00 78 7F 7F 4A 02 00 78 7F 72 | .P.D...x..J..x.r |
| 0001B0: | 4C 60 45 57 3E 4A 36 3E 4A 02 00 5B 00 1D 19 14 | L`EW>J6>J..[.... |
| 0001C0: | 12 0C 0B 07 04 02 00 66 00 00 00 10 00 00 79 73 | .......f......ys |
| 0001D0: | 00 6E 00 66 00 5B 00 00 00 38 00 44 00 2C 00 21 | .n.f.[...8.D.,.! |

FIG. 2(CONTINUED)-I

```
001E0: 00 18 00 10 00 09 00 04 00 00 78 7F 70 7E 69 7B  ........x.p-i(
001F0: 62 77 5B 72 53 6B 4C 60 6E 36 3E 4A 36 2F 32  bw[rSkL`EW>J6>/2
00200: 28 27 21 1D 19 00 21 00 0C 00 18 00 7F 00 7D 44  ('!.....!......P.D
00210: 00 7D 00 79 00 2C 00 00 00 00 00 00 00 00 00 00  .).y.s.n.f.[.P.D
00220: 00 38 00 2C 00 7E 69 2F 00 00 09 04 00 00 00 00  .8..!......
00230: 78 7F 70 7E 69 2F 00 00 45 0B 00 4C 60 0C 45 57  x.p-i(bw[rSkL`EW
00240: 3E 4A 36 2F 00 00 00 00 00 00 0B 00 0C 0B 07  >J6>/2('!.....
00250: 04 02 00 00 00 00 50 00 00 00 66 10 00 66 00 66  ...).).y.s.n.f
00260: 00 5B 00 00 7B 4A 02 00 5B 00 00 00 18 00 5B 72  .[.P.D..!.....
00270: 00 09 00 04 60 45 0B 00 4C 60 0C 6E 77 21 1D  ...x.p-i(bw[r
00280: 53 6B 4C 60 45 0B 00 00 5B 00 66 10 00 18 00 79  SkL`EW>J6>/2('!
00290: 19 14 12 0C 00 6E 18 00 77 62 27 7D 00 00 2C  .).).y.s.n.f
002A0: 00 73 00 44 00 00 00 78 7F 70 36 00 00 38 00 2C  .!.P.D..!..y
002B0: 00 21 00 0C 00 18 00 7F 70 36 3E 4A 36 3E 3E  !.[.P.D..x.p-
002C0: 69 7B 62 27 7D 00 50 00 00 04 02 00 7F 00 50  i(bw[rSkL`EW>J6>
002D0: 2F 00 7D 00 00 00 5B 00 00 00 00 00 5B 00 50  /2('!.....P
002E0: 00 44 00 00 78 38 00 00 09 00 66 00 10 00 00 04  .).).y.s.n.f.[
002F0: 00 00 00 7F 70 7E 3E 4A 18 00 00 00 00 00 60  .D..!......x.p-i(bw[rSkL`
00300: 00 78 3E 4A 36 3E 4A 02 5B 00 00 6B 4C 12 0C  ..x.p-i(bw[rSkL`
00310: 45 57 3E 4A 36 3E 4A 02 5B 00 66 6B 14 12 0C  EW>J6>/2('!
00320: 0B 07 04 02 00 5B 00 09 00 00 00 73 19 00 6E  .!.).).y.s.n
00330: 00 66 00 00 66 00 10 00 00 50 00 00 21 00 73  .[.P.D..!.
00340: 00 10 00 00 66 00 10 00 18 00 7E 69 7B 62 77  ...x.p-i(bw
00350: 5B 72 53 6B 4C 60 45 0B 00 4C 60 3E 2F 32 28 27  [rSkL`EW>J6>/2('
00360: 21 1D 19 00 73 00 21 00 0C 00 7F 00 50 00 7D  !.....).y.s.n.f
00370: 00 79 00 00 00 44 00 00 04 00 00 7D 00 00 38  .y.s.n.f..[.P.D.8
00380: 00 2C 00 00 00 00 00 04 00 00 00 78 3E 4A  ..!......x.
00390: 70 7E 69 7B 62 2F 00 00 45 0B 00 4C 60 07 04 4A  p-i(bw[rSkL`EW>J
003A0: 36 3E 4A 02 00 00 5B 00 00 00 00 00 00 5B 02  6>/2('!.....
003B0: 00 7F 00 50 00 00 00 04 00 00 66 00 00 00 5B  .P.D..!......[
003C0: 00 50 00 04 00 66 00 66 00 10 10 00 10 00 09  .P.D..!.....
003D0: 00 04 00 00 78 7F 70 78 62 77 5B 77 5B 53 6B  ....x.p-i(bw[rSk
```

FIG. 2 (CONTINUED) - J

```
003E0:  4C 60 45 57 3E 4A 36 3E 2F 28 27 21 1D 19 14    L`EW>J6>/2('!....
003F0:  12 0C 0B 07 04 02 00 00 7F 00 7D 00 79 00 73    .........}.y.s
00400:  00 6E 00 66 00 5B 00 5B 00 50 00 44 00 38 00 21    .n.f.[.P.D.8..!
00410:  00 18 00 10 00 09 00 04 00 00 7E 70 7F 7E 69 7B    ..........x.p-i(
00420:  62 77 5B 72 53 19 1D 4C 60 45 57 3E 4A 36 3E 32    bw[rSkL`EW>J6>/2
00430:  28 27 7D 00 79 00 73 00 6E 00 66 00 5B 00 50 7D    ('!....).y.s.n.f.[.P.D
00440:  00 7D 00 38 00 21 00 18 00 10 00 09 00 04 00 44    .}.8..!.......
00450:  00 00 00 00 00 00 00 00 00 00 00 00 00 00 00    ..............
00460:  78 7F 70 7E 69 7B 62 77 5B 72 53 19 1D 4C 60 45 57    x.p-i(bw[rSkL`EW
00470:  3E 4A 36 3E 2F 28 27 7D 00 79 00 73 00 6E 00 6E    >J6>/2('!....
00480:  04 02 00 00 7F 00 50 00 44 00 38 00 2C 00 10    ....(.P.D.8..!
00490:  00 5B 00 00 04 00 00 00 00 78 7F 7E 7F 70 7E    .[.P.D.8..x.p-
004A0:  00 09 00 00 00 00 00 00 00 00 00 00 00 00 00    .!.............x.p-
004B0:  53 6B 4C 60 45 57 3E 4A 36 3E 2F 28 27 7D 00    i(bw[rSkL`EW>J6>
004C0:  19 14 12 0C 0B 07 04 02 00 5B 00 50 00 00 79    /2('!....).y.s.n.f.[.P
004D0:  00 73 00 6E 00 66 00 10 00 00 18 00 00 00 2C    ..D.8..!.......x.p-
004E0:  00 21 00 00 7E 7F 70 7E 69 7B 62 77 5B 72 53    ...x.p-i(bw[rSkL`
004F0:  69 7B 62 77 5B 72 53 19 1D 4C 60 45 57 3E 4A    i(bw[rSkL`EW>J6>
00500:  2F 28 27 7D 00 79 00 73 00 6E 00 66 00 5B 00    /2('!....).y.s.n.f.[.P
00510:  00 7D 00 38 00 7D 00 79 00 73 00 6E 00 66 00    .D.8..!....).y.s.n.f.[.P
00520:  00 44 00 00 00 00 00 00 00 00 00 00 00 00 00    .D.8...........
00530:  00 00 78 7F 70 7E 69 7B 62 77 5B 72 53 19 1D    ..x.p-i(bw[rSkL`
00540:  45 57 3E 4A 36 3E 2F 28 27 7D 00 79 00 73 00    EW>J6>/2('!....y.s.n
00550:  0B 07 04 02 00 00 00 00 00 00 00 00 00 00 00    ......!....y.s.n
00560:  00 66 00 00 7F 70 7F 70 7E 69 7B 62 77 5B 72    .f.!.......x.p-i(bw
00570:  00 10 00 00 00 04 00 00 7E 3E 4A 36 3E 2F 28 27    ....x.p-i(bw
00580:  5B 72 53 19 1D 4C 60 45 57 3E 4A 36 3E 2F 28    [rSkL`EW>J6>/2(
00590:  21 1D 19 14 12 0C 0B 07 04 02 00 7F 00 7D 00    !....).).P.D.8
005A0:  00 79 00 73 00 6E 00 66 00 5B 00 50 00 44 00    .y.s.n.f.[.P.D.8
005B0:  00 00 00 2C 00 21 00 00 18 00 10 00 00 00 00    ...!....x.
005C0:  70 7E 69 7B 62 77 5B 72 53 19 1D 4C 60 45 57    p-i(bw[rSkL`EW>J
005D0:  36 3E 2F 28 27 7D 00 79 00 73 00 6E 00 66 00    6>/2('!....).y.s.n.f.[
005E0:  00 7F 00 7D 00 44 00 38 00 7F 3E 4A 02 00 5B    ..}.D.8..!
```

FIG. 2(CONTINUED) – K

```
005F0: 00 50 00 44 00 00 38 00 21 00 18 00 10 00 09  .P.D..8..!......
00600: 00 04 00 00 00 78 7F 70 7B 62 28 27 7D 53 6B  .....x.p{b('}Sk
00610: 4C 60 45 0B 07 04 3E 4A 36 2F 00 7D 1D 19 14  L`E...>J6/.}...
00620: 12 0C 0C 0B 00 66 00 02 00 50 00 00 00 19 00 73  .....f...P.....s
00630: 00 6E 18 00 6E 00 10 00 09 6B 00 50 00 2C 00 21  .n..n....k.P.,.!
00640: 00 18 00 00 00 66 00 10 00 00 04 60 0C 6E 00 7B  .....f.....`.n.{
00650: 62 77 5B 72 53 6B 60 4C 4C 0C 60 45 0B 07 04 32  bw[rSkL`EW>J6>/2
00660: 28 27 21 1D 19 14 12 0C 0B 00 66 00 10 00 00 04  ('!.......f.....
00670: 00 7D 00 79 00 2C 00 21 00 18 00 00 00 50 00 44  .).y.s.n.f.(.P.D
00680: 00 38 00 00 00 21 00 18 00 10 00 09 00 00 00 08  .8...!..........
00690: 00 78 7F 70 7B 62 28 27 7D 53 6B 4C 60 45 0B 57  .x.p-i(bw[rSkL`EW
006A0: 3E 4A 36 2F 00 7D 00 79 00 2C 00 21 00 18 00 66  >J6>/2('!.......y.s.n.f
006B0: 04 02 00 5B 00 00 00 0B 00 14 12 0C 60 00 10 00  .....!...x.p-i(bw[r
006C0: 00 5B 00 00 00 00 00 50 00 44 00 38 00 00 00 72  SkL`EW>J6>/2('!..y
006D0: 00 09 00 00 00 04 00 78 7F 70 7B 62 28 27 7D 1D  .s.n.f..!...x.p-
006E0: 53 6B 4C 60 45 0B 07 04 3E 4A 36 2F 00 7D 00 79  SkL`EW>J6>/2('!..y
006F0: 19 14 12 0C 0C 0B 00 66 00 00 00 78 7F 70 00 2C  ......).).y.s.p-
00700: 00 73 00 00 00 38 00 00 00 50 00 44 00 38 00 7E  .s..8....P.D.8.
00710: 00 21 00 00 00 00 04 02 00 5B 00 00 00 00 3E     .!........x.p-i(bw[r
00720: 69 7B 62 32 28 27 7D 00 7F 00 04 60 00 5B 00 4A  i(bw[rSkL`EW>J6>
00730: 2F 00 7D 00 38 00 00 00 00 50 00 44 00 38 00 02  /2('!..........
00740: 00 7D 00 44 00 00 00 78 7F 70 4C 60 00 5B 00 7F  .D.8.....x.p...P
00750: 00 00 00 00 00 00 78 7F 70 0B 07 04 60 00 09 00 50  .....y.s.n..{.P
00760: 45 57 3E 4A 36 2F 00 7D 00 79 00 2C 00 21 00 6B  .x.p-i(bw[rSkL`
00770: 0B 07 00 66 00 10 00 00 04 02 00 5B 00 14 12 0C  EW>J6>/2('!....
00780: 00 66 00 00 00 10 00 00 00 38 00 00 00 73 00 6E  .f......)..y.s.n
00790: 00 10 00 09 00 00 00 04 60 00 5B 00 00 09 00 18  ....f.(.P.D.8..!
007A0: 00 66 00 10 00 00 00 00 00 50 00 44 00 44 00 77  ...x.p-i(bw[rSkL`
007B0: 5B 72 53 6B 4C 60 45 0B 07 04 3E 4A 36 2F 00 7D 27  EW>J6>/2('!....
007C0: 21 1D 19 14 12 0C 00 0B 00 66 00 10 00 00 00 7D  !.......)..y.s.n.f
007D0: 00 79 00 00 00 38 00 00 00 00 50 00 44 00 00 38  .y.s..!........
007E0: 00 00 00 00 00 00 00 78 7F 70 00 00 00 78 7F     !..........x.
007F0: 70 7E 69 7B 62 28 27 7D 53 6B 4C 60 45 0B 57 4A  p-i(bw[rSkL`EW>J
```

FIG. 2 (CONTINUED)-L

```
<< Contents of C3 rom>>                                              ASCII
                                                                     REPRESENTATION
000000: 00 FC 00 F9 00 F6 00 F4 00 F2 00 F0 00 F1 00 F1   ................
000010: 00 F3 00 F5 00 F7 00 F9 00 FC 00 FD 00 FF 00 00   ................
000020: 00 00 7B 41 FB 74 3A 6D 33 00 F6 F5 F3 F1 F1 F0   ..{A.t:m3.......
000030: 49 F1 F2 FE F3 00 6D 33 F8 F6 FA 57 FC F1 50 FE   I.....m3...W..P.
000040: 0F FF 07 00 00 00 00 00 2C 00 F9 F5 F5 1D FC 16   ........,.......
000050: 00 F0 00 F1 00 F1 00 F0 00 F5 F8 24 00 FC 00 00   ...........$....
000060: 00 FD 00 FF 00 00 00 F1 00 F3 00 F5 00 F7 66 F2   ..............f.
000070: 5E F3 F1 FC F1 50 F0 FE FE 74 FB 6D 2C 00 F5 FC   ^....P...t.m,...
000080: 24 FA 1D FC 16 00 F2 00 FE F2 3A F3 00 00 F8 F5   $.........:.....
000090: 00 F6 00 F4 00 F2 00 FC F5 F8 00 00 00 00 F9 F5   ................
0000A0: 00 F7 00 F9 00 FC 00 FD 00 00 00 F1 00 F3 00 FE   ................
0000B0: 74 FB 6D 33 00 5E F3 FA F1 50 F0 FE F1 41 7B F2   t.m3.^...P...A{.
0000C0: 3A F3 F6 FC F8 24 00 F2 FC F4 16 FE 0F 07 00 00   :....$..........
0000D0: 00 00 00 FC F9 F6 F3 F6 F6 00 F0 00 F2 00 F0 F1   ................
0000E0: 00 00 00 F3 00 00 F8 FB F3 FB 00 FD 00 FC 00 FF   ................
0000F0: 50 F0 49 F1 F2 FE F2 F6 00 F7 00 FF 00 F1 57 F1   P.I...........W.
000100: 16 FE 0F FF 07 00 00 F0 00 F0 00 00 00 00 FA F1   ................
000110: 00 F2 00 FC 00 F0 00 FD F5 F5 F5 F8 F9 00 F3 FC   ................
000120: 00 FC 00 FD 00 FF 00 00 00 F1 00 F3 00 F5 00 F1   ................
000130: 66 F5 5E F3 FA F1 FC F1 50 F0 FE 74 FB 6D 33 F6   f.^.....P..t.m3.
000140: 2C F8 24 FA 1D FC 16 00 F4 00 F2 00 F0 00 00 00   ,.$.............
000150: 00 F9 00 F6 00 F4 00 F9 00 FF 00 FD 00 00 00 FC   ................
000160: 00 F5 00 F7 00 FB 00 F3 00 F1 00 F1 00 F0 49 F1   ..............I.
000170: 7B FE 74 3A 6D 33 F6 F5 5E 24 FA 1D FC F0 FE 0F   {.t:m3..^$......
000180: 41 F2 3A F3 00 00 00 00 00 00 00 00 00 F2 00 FF   A.:.............
000190: 07 00 00 00 00 F0 00 F4 00 F6 00 F9 00 FC 00 FD   ................
0001A0: 00 F1 00 00 00 F3 00 00 F7 00 FB FE 74 FB 6D FC   .............t.m
0001B0: 00 FF 00 00 00 F1 00 F3 00 F5 00 F7 66 F5 5E F3   ............f.^.
0001C0: 57 F1 50 F0 49 F1 F2 3A F3 F6 2C F8 24 FA F3 FA   W.P.I..:..,.$...
```

FIG. 2(CONTINUED) – M

| | | | | | | | | | | | | | | | | | |
|---|---|---|---|---|---|---|---|---|---|---|---|---|---|---|---|---|---|
| 001E0: | 1D | FC | 16 | FE | 0F | FF | 07 | 00 | 00 | 00 | 00 | FC | 00 | F9 | F6 | | ........ |
| 001F0: | 00 | F4 | 00 | F2 | 00 | F0 | 00 | F1 | 00 | F3 | 00 | F5 | 00 | F7 | | | ........ |
| 00200: | 00 | F9 | 00 | FC | 00 | FD | F3 | FE | 00 | 00 | 7B | 00 | 74 | FB | | | ......{.t. |
| 00210: | 6D | F7 | 66 | F5 | 5E | F3 | 57 | F1 | 50 | F0 | 49 | FE | 3A | F3 | | | m.f.^.W.P.:. |
| 00220: | 33 | F6 | 2C | F8 | 24 | FA | 1D | FC | 16 | FE | 0F | FF | 00 | 00 | | | 3.,.$....... |
| 00230: | 00 | FC | 00 | F9 | 00 | F6 | 00 | F3 | 00 | F0 | 00 | FD | 00 | F1 | | | ........ |
| 00240: | 00 | F3 | 00 | F5 | 00 | F7 | 00 | F9 | 00 | FC | 00 | FD | 50 | F0 | | | ........(.t. |
| 00250: | 00 | 00 | 7B | FE | 74 | FB | 6D | F7 | 66 | F5 | 5E | F3 | 57 | F1 | 16 | FE | ..{.t.m.f.^.W.P. |
| 00260: | 49 | F1 | 41 | F2 | 3A | F3 | 33 | F6 | 2C | F8 | 24 | FA | 1D | FC | 00 | 00 | I.A.:.3.,.$... |
| 00270: | 0F | FF | 07 | 00 | 00 | 00 | 00 | FC | 00 | F9 | 00 | F6 | 00 | FC | F2 | | ......... |
| 00280: | 00 | F0 | 00 | F1 | 00 | FF | 00 | FD | 00 | F1 | 00 | F3 | 00 | F5 | F5 | | ........ |
| 00290: | 00 | FD | 00 | F1 | 50 | F0 | FE | F2 | 00 | 00 | 7B | FE | 74 | FB | F8 | | ....(.t.m.f. |
| 002A0: | 5E | F3 | 57 | F1 | 50 | F0 | 49 | F1 | 41 | F2 | 3A | F3 | 00 | 7B | F9 | | ^.W.P.I.A.:.3., |
| 002B0: | 24 | FA | 1D | FC | 16 | FE | 0F | FF | 00 | 00 | 00 | 00 | 41 | F2 | F5 | | $......(. |
| 002C0: | 00 | F6 | 00 | F3 | 00 | F0 | 00 | FD | 00 | FF | 00 | F1 | 00 | F3 | FE | | .........(.t.m.f. |
| 002D0: | 00 | F7 | 00 | F9 | 00 | FC | 00 | FD | 00 | F1 | 50 | F0 | FE | F2 | F2 | 00 | ........(.t.m.f. |
| 002E0: | 74 | FB | 6D | F7 | 66 | F5 | 5E | F3 | 57 | F1 | 50 | F0 | 49 | F1 | 00 | F1 | t.m.f.^.W.P.I.A |
| 002F0: | 3A | F3 | 33 | F6 | 2C | F8 | 24 | FA | 1D | FC | 16 | FE | 0F | FF | FF | | :.3.,.$..... |
| 00300: | 00 | 00 | 00 | 00 | FC | 00 | F9 | 00 | F6 | 00 | F3 | 00 | F0 | 00 | F1 | | ........(.t.^.W. |
| 00310: | 00 | F1 | 00 | F3 | 00 | F5 | 00 | F7 | 00 | F9 | 00 | FC | 5E | F3 | 57 | F1 | ........^.W. |
| 00320: | 00 | 00 | 00 | 00 | FF | F1 | FC | F5 | F8 | F9 | F5 | F8 | 24 | FA | 1D | FC | ...........3..$. |
| 00330: | 50 | F0 | 49 | FE | 00 | F0 | 00 | FC | 00 | FC | 00 | F5 | 00 | F9 | 00 | F4 | P.I........ |
| 00340: | 16 | FE | 0F | FF | 00 | F1 | 00 | F1 | 00 | F3 | 00 | F5 | 00 | F7 | 00 | F9 | .......... |
| 00350: | 00 | FC | 00 | FD | 00 | FF | 00 | F0 | 00 | FD | 00 | F1 | FE | FB | FE | F7 | ..........(.t.m |
| 00360: | 66 | F5 | 5E | F3 | 57 | F1 | 50 | F0 | 49 | F1 | 41 | F2 | 74 | FB | 6D | F6 | f.^.W.P.I.A.t.m |
| 00370: | 2C | F8 | 24 | FA | 1D | FC | 16 | FE | 0F | FF | 00 | 00 | 3A | F3 | 33 | FC | ,.$.........:..3 |
| 00380: | 00 | F9 | 00 | F6 | 00 | F3 | 00 | F0 | 00 | FD | 00 | FF | 00 | 00 | 00 | F3 | ........$. |
| 00390: | 00 | F5 | 00 | F7 | 00 | F9 | 00 | FC | 00 | FD | 00 | F1 | 50 | F0 | 00 | 00 | ............(.t.m.f. |
| 003A0: | 7B | FE | 74 | FB | 6D | F7 | 66 | F5 | 5E | F3 | 57 | F1 | 16 | FE | 49 | F1 | {.t.m.f.^.W.P.I. |
| 003B0: | 41 | F2 | 3A | F3 | 33 | F6 | 2C | F8 | 24 | FA | 1D | FC | 0F | FF | FF | | A.:.3.,.$.... |
| 003C0: | 07 | 00 | 00 | 00 | 00 | FC | 00 | F9 | 00 | F6 | 00 | F3 | 00 | F0 | F0 | | ........ |

VIDEO SAMPLE RATE CONVERTER

BACKGROUND OF THE INVENTION

1. Field of the Invention

The present invention relates to a sampled video processors, and in particular, to video sample rate converters.

2. Description of the Related Art

Digital video effects systems, including digital video effect generators and video combiners, are well known and widely used in the art. Generally, a digital video effects system receives at least two video input signals, with one selected for use as a video fill signal and the other selected for use as a video background signal. This selection involves another input signal, i.e. a key signal, which selectively keys the fill video over the background video. If the video input signals are digital, they are typically in accordance with the SMPTE D1 standard. However, sometimes one or more of the input signals may be in accordance with the SMPTE D2 standard, thereby requiring conversion to the SMPTE D1 standard. These video signals can then be processed in accordance with a number of well known video effects. For example, the fill video can be keyed onto the background video with perspective or rotational effects, or a video image can be constructed which appears to be a three-dimensional object with fill video occupying the faces of the object. While all of the foregoing, and much more, can be achieved with conventional digital video effects systems, many limitations have existed.

A problem with conventional systems involves video sampling rates. Frequently, an available video signal is a composite video baseband signal sampled at a frequency of approximately 14.3 MHz, according to the SMPTE D2 standard. However, systems must often be operated according to the SMPTE D1 (CCIR 601) standard, requiring a component video baseband signal sampled at a frequency of approximately 13.5 MHz. Conventional video sample rate converters have used a plurality of multi-tap finite impulse response ("FIR") digital filters (e.g. one each for both the luminance and chrominance component signals) with time variant filter coefficients to provide this rate conversion. However, such rate converters involve complex circuits requiring many components and a relatively large amount of space.

SUMMARY OF THE INVENTION

A video sample rate converter in accordance with the present invention uses a single modified multi-tap finite impulse response ("FIR") digital filter which alternately functions as a data selector and two-point linear interpolator, and as a four-point polyphase interpolator.

An input interleaved digital component video signal having a first sample rate is digitally filtered with this modified FIR filter, using preprogrammed and time variant switched filter coefficients and a selectively inhibited output clock signal to produce an output interleaved digital component video signal having a second, lower sample rate.

These and other objectives, features and advantages of the present invention will be understood upon consideration of the following detailed description of the invention and the accompanying drawings.

BRIEF DESCRIPTION OF THE DRAWINGS

FIGS. 2, 2(A)-2(O) are tables of preprogrammed digital filter coefficients for the video sample rate converter of FIG. 1.

DETAILED DESCRIPTION OF THE INVENTION

Figure 1:
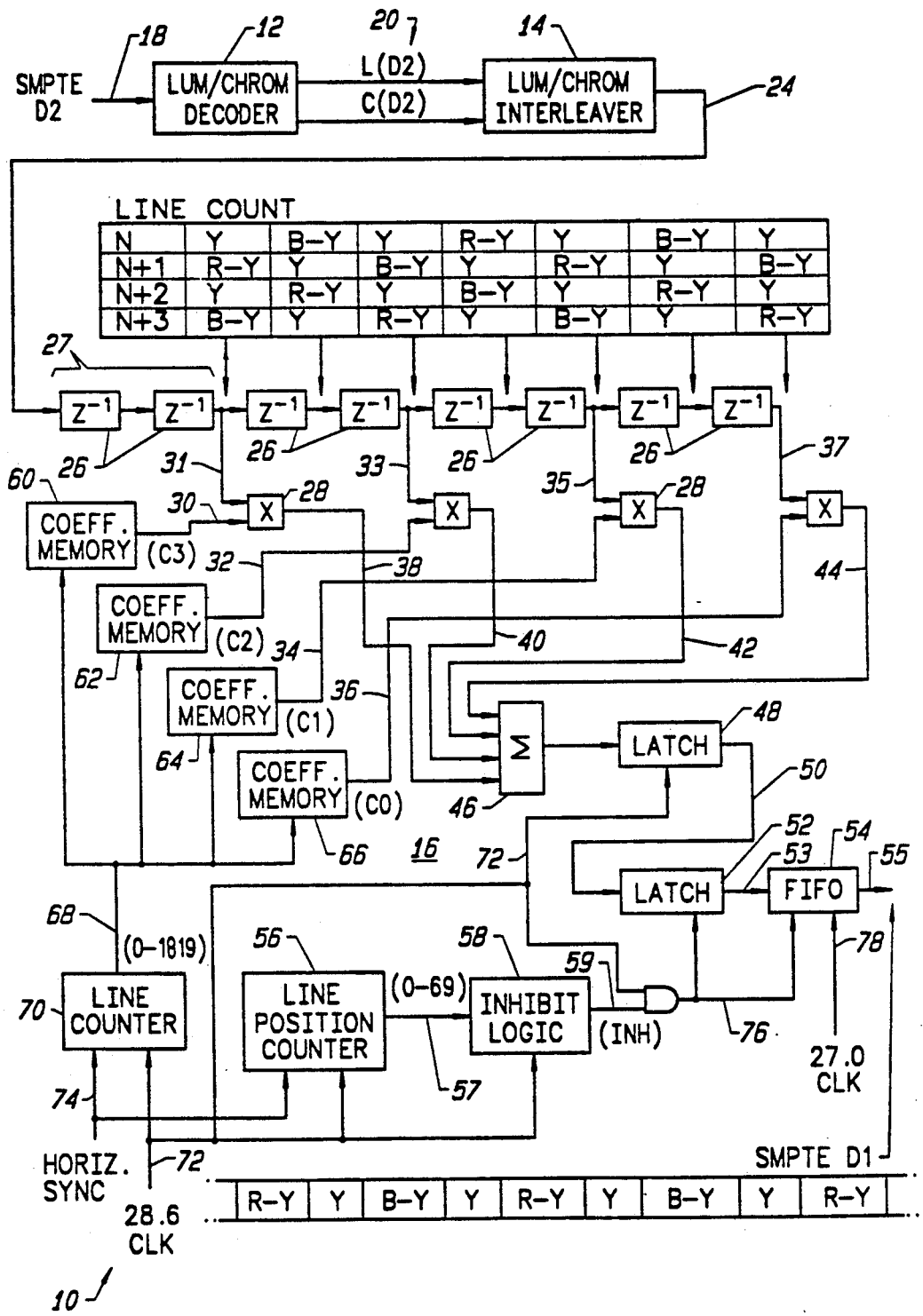
FIG. 1 is a functional block diagram of a video sample rate converter in accordance with the present invention.

Throughout the following description, references to signal formats, frequencies and bandwidths reflect the use of a preferred embodiment of the present invention with video according to the NTSC video standard or component video suitable for encoding according to the NTSC standard. However, it should be understood that alternative embodiment of the present invention for systems operating according to other video standards, such as PAL or SECAM, can also be realized in accordance with the following discussion.

The present invention can be used in association with the apparatuses and methods disclosed in the following commonly assigned, copending patent applications: Ser. No. 07/677,382, entitled "An Improved Networked Modular Video Processing System" and filed by Beaulier et al. on Mar. 28, 1991; Ser. No. 07/677,383, entitled "A Video Processing System Having Improved Graphics Display And Performance" and filed by Beaulier on Mar. 28, 1991; Ser. No. 07/678,042, entitled "A Video Processing System With Improved Graphical Control And Real Time Interaction With External Devices" and filed by Bershtein et al. on Mar. 28, 1991; Ser. No. 07/678,041, entitled "A Video Processing System Having Improved Internal Switching Capability" and filed by Beaulier et al. on Mar. 28, 1991; Ser. No. 07/678,011, entitled "A Video Processing System Having Improved Transition Control And Display" and filed by Pelley on Mar. 28, 1991; Ser. No. 07/678,012, entitled "A Video processing System Having Improved Interface With External Devices" and filed by Bershtein on Mar. 28, 1991; Ser. No. 07/677,381, entitled "A Video Processing System Having Improved Synchronization" and filed by Griffen on Mar. 28, 1991; Ser. No. 07/677,790, entitled "Digital Special Effects Video Generator With Three-Dimensional Image Generator" and filed by Wolf and Rolhfs on Mar. 29, 1991; Ser. No. 07/685,826, entitled "Improved Digital Video Effects Generator" and filed by Woodham on Apr. 12, 1991; Ser. No. 07/685,825, entitled "Improved Digital Video Effects Generator" and filed by Wolf and Kulmaczewski on Apr. 12, 1991; and Ser. No. 07/685,225, entitled "Improved Video Combiner" and filed by Ritter on Apr. 12, 1991. The specifications of the foregoing patent applications are incorporated herein by reference.

Referring to FIG. 1, a video sample rate converter 10 in accordance with the present invention includes a luminance/chrominance decoder 12, a luminance/chrominance interleaver 14 and a modified 4-tap digital finite impulse response ("FIR") filter 16, substantially as shown. This video sample rate converter 10 takes advantage of the fact that luminance bandwidth is much greater than chrominance bandwidth, which thereby allows chrominance information to be interleaved at twice the rate of luminance information.

A digital video input signal 18 in accordance with the SMPTE D2 standard is decoded by a luminance/chrominance decoder 12 into its luminance and chrominance components 20. These components 20 are interleaved by a luminance/chrominance interleaver 14 to produce an interleaved luminance/chrominance video signal 24 having twice the SMPTE D2 sample rate, i.e. approximately 28.6 MHz. The 28.6 MHz sample rate of this interleaved video component signal 24 is converted by the FIR filter 16 to a SMPTE D1 interleaved sample rate of approximately 27.0 Mhz.

The interleaved components of the interleaved component signal 24 are successively clocked through unit time delay elements 26 and tapped at the output of every other time delay element 26 for multiplication within the multipliers 28 by separate and distinct multiplying coefficients 30, 32, 34, 36. The product outputs 38, 40, 42, 44 are algebraically summed within an adder 46, with the resulting sum briefly held in a latch 48. The latched sum 50 is itself latched by a second latch 52, and the doubly latched sum signal 53 is outputted via a first-in, first-out ("FIFO") memory 54. The output signal 55 is SMPTE D1 interleaved component video.

The multiplying coefficients 30, 32, 34, 36 are provided by their respective coefficient memories 60, 62, 64, 66. These memories 60, 62, 64, 66, preferably comprising look-up tables ("LUTs"), are addressed by an address signal 68 generated by a resettable counter 70. The resettable counter 70 is clocked by a 28.6 MHz (approximately) clock 72 (i.e. twice the SMPTE D2 sample rate) and is reset by a horizontal synchronization signal 74. The address signal 68 provides a range of address values of zero through 1819, i.e. 0-1819, inclusive.

Figure 2:
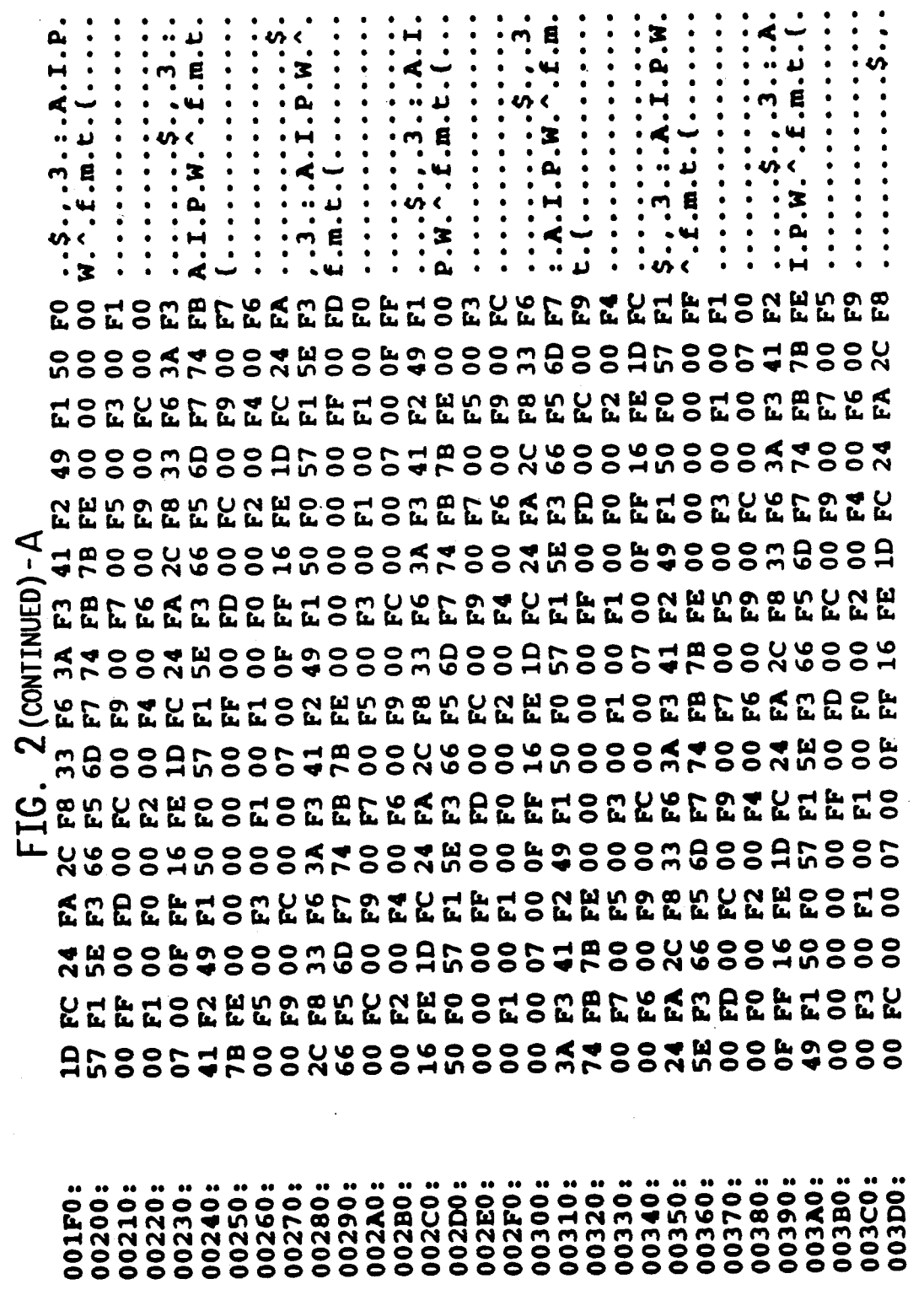
Figure 2:
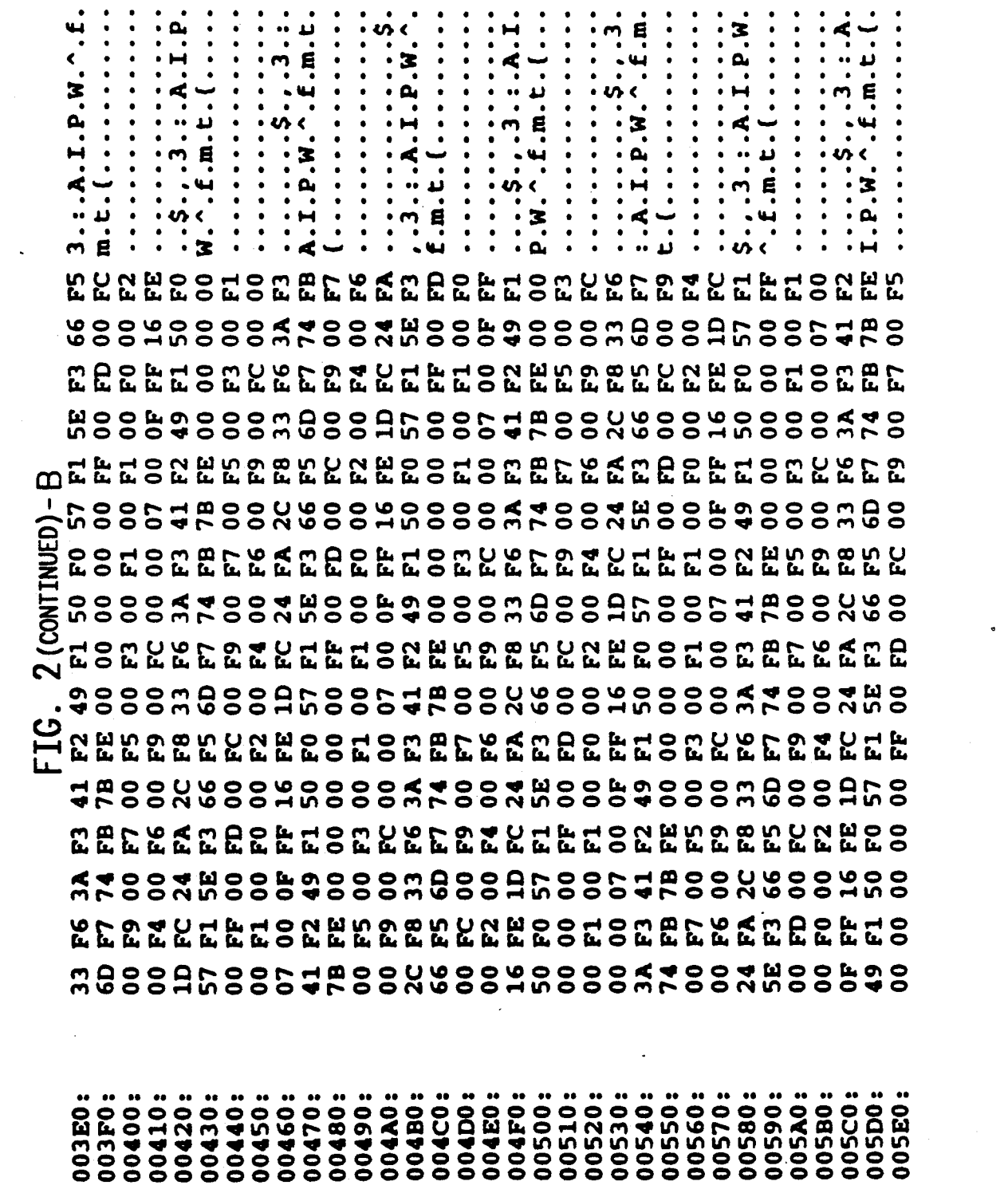
Figure 2:
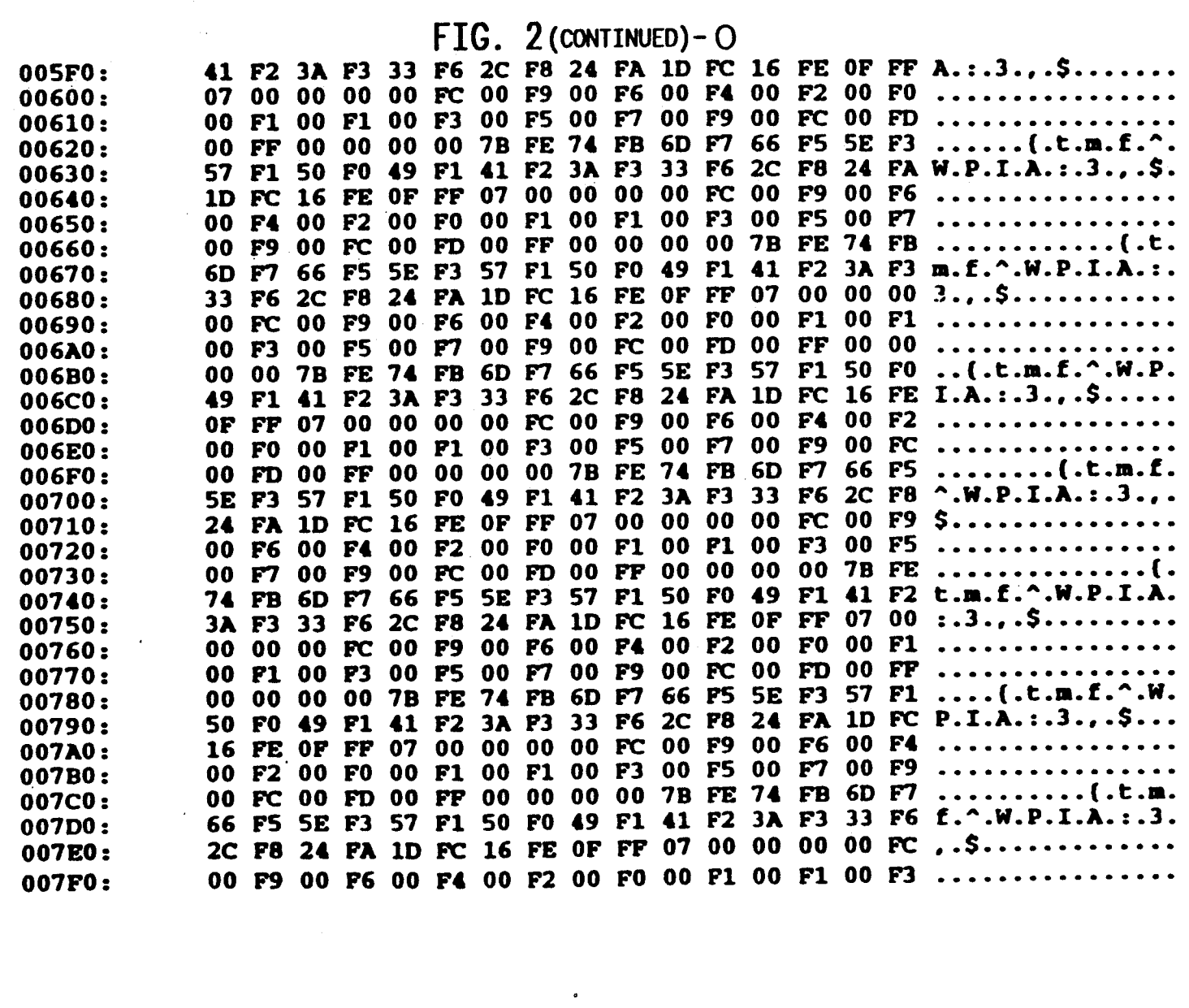
Figure 2:
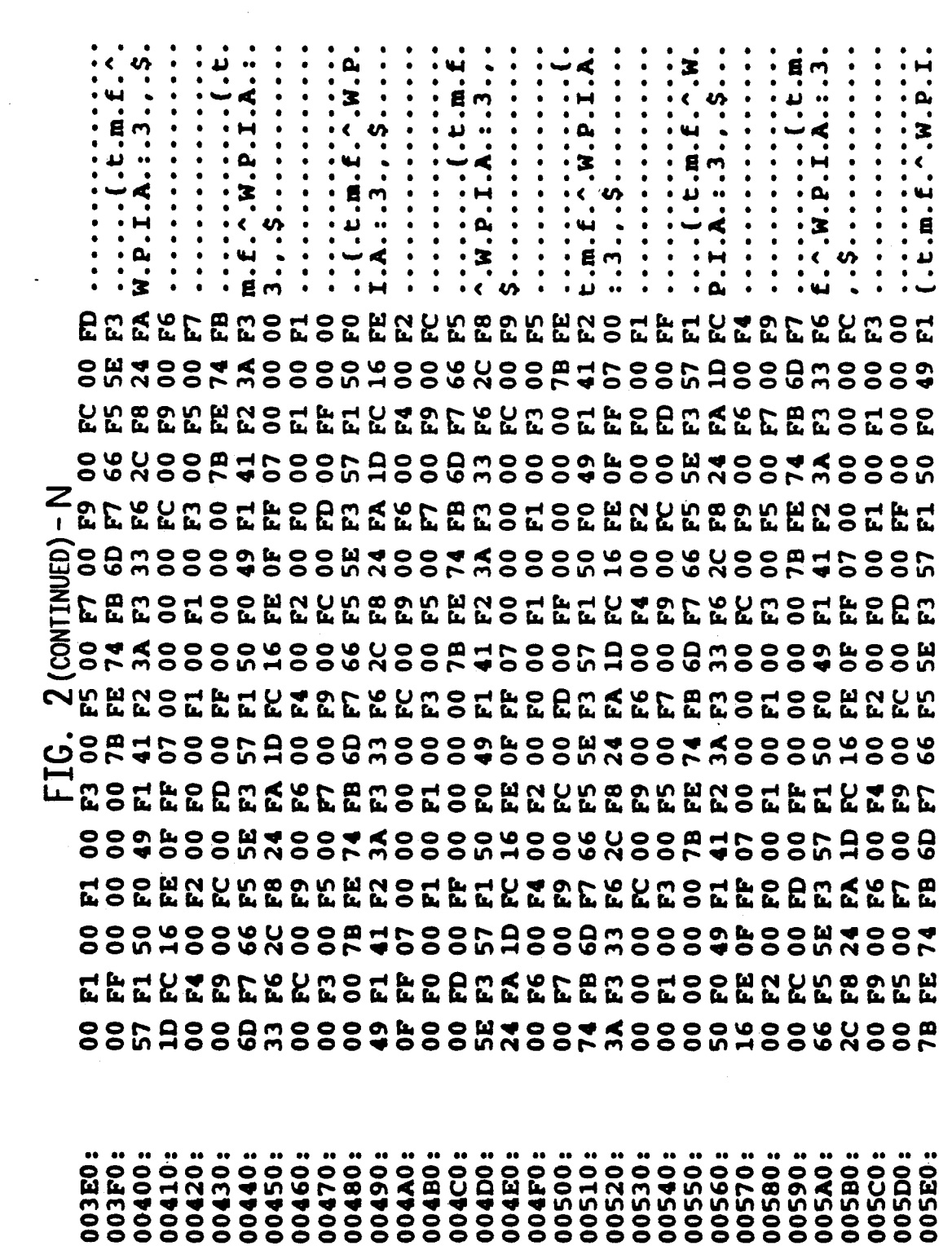

Referring to FIGS. 2, 2(A)-2(O), the multiplying coefficients 30, 32, 34, 36 (identified as C3, C2, C1 and C0, respectively) have time variant values for multiplying with their respective tapped interleaved video components 31, 33, 35, 37 originating from the interleaved video signal 24. As discussed below, at every other video line count, the multiplying coefficients 30, 32, 34, 36 cause the FIR filter 16 to alternately function as a data selector and two point linear interpolator, or as a four point polyphase interpolator.

This modified FIR filter 16 includes two unit time delay elements 26 between each tap point signal 31, 33, 35, 37. In a preferred embodiment of the present invention, the first pair 27 of the unit time delay elements 26 is included. However, this pair 27 of elements 26 need not necessarily be used, and the interleaved component signal 24 can be coupled directly to the remaining unit time delay elements 26 and the multiplier 28 where the first tapped interleaved video component 31 is coupled.

At line count N, the tapped data 31, 33, 35, 37 represent luminance data and the FIR filter 16 functions as a four point polyphase interpolator. Therefore, at line count N, the multiplying coefficients 30, 32, 34, 36 are polyphase interpolation coefficients, as seen in FIG. 2. This results in a sum output 50 representing luminance data.

At line count N+1, two tapped data signals 31, 35 represent red component video data, and two tapped data points 33, 37 represent blue chrominance component data. At line count N+1, the two coefficients 30, 34 corresponding to the red chrominance component data 31, 35 are zeros, and the two coefficients 32, 36 corresponding to the blue chrominance components 33, 37 are linear interpolation coefficients, as seen in FIGS. 2, 2(A)-2(O). Therefore, the FIR filter 16 functions as a data selector and two point linear interpolator for the blue chrominance component data.

At line count N+2, the FIR filter 16 again functions as a four point polyphase interpolator for luminance data, as discussed above.

At line count N+3, two different tapped video data signals 31, 35 now represent blue chrominance component data, and the other tapped video data signals 33, 37 now represent red chrominance component data. At line count N+3, the coefficients 30, 34 corresponding to the blue chrominance component data 31, 35 are now zeroes, and the coefficients 32, 36 corresponding to the red chrominance component data 33, 37 are now linear interpolation coefficients, as seen in FIGS. 2, 2(A)-2(O). Therefore, at line count N+3, the FIR filter 16 is again functioning as a data selector and two point linear interpolator, but now for red chrominance component data rather than blue chrominance component data.

For every 35 video samples (represented by the sum signal 50) received by the second latch 52, 33 video samples are outputted via the latch 52 and FIFO 54. Identity data points, i.e. those video data points representing identical, e.g. duplicative, video data, are "ignored," i.e. not passed, by the second latch 52 and FIFO 54, in accordance with a selectively inhibited clock signal 76 (discussed further below) used as the clock signal for the second latch 52 and as the input clock signal for the FIFO 54.

The first latch 48 provides its latched output 50 in accordance with the 28.6 MHz clock signal 72 which has a regular periodicity. However, this latched signal 50 is latched by the second latch 52 in accordance with a selectively aperiodic, e.g. selectively inhibited, clock signal 76 which is produced by logically "AND"-ing the 28.6 Mhz clock signal 72 with an inhibit signal 59 produced by inhibit logic 58 (discussed further below). Thus, when the inhibit signal 59 is "true" (i.e. a logical zero), the pulse which would have otherwise occurred as the latch 52 and FIFO 54 input clock signals 76 due to the 28.6 MHz clock signal 72 is inhibited, or "swallowed."

This produces a selectively aperiodic secondary latched signal 53, which in turn, is inputted into the FIFO 54 in accordance with the same selectively aperiodic clock signal 76. The output signal 55 from the FIFO 54 is provided in accordance with an output clock signal 78 having a regular periodicity and an approximate frequency of 27.0 MHz (i.e. at the SMPTE D1 sample rate). This causes the final output signal 55 to be a regularly periodic SMPTE D1 interleaved component video signal.

The inhibit signal 59 is generated by the inhibit logic 58 in accordance with a line position count signal 57 provided by a line position counter 56 and the 28.6 MHz clock signal 72. The line position count signal 57 provided by the line position counter 56 has a range of count values of zero through 69, i.e. 0-69, inclusive. This signal 57 repeatedly counts 0-69 in accordance with the 28.6 MHz clock signal 72, resetting and restarting its count upon reception of the horizontal synchronization signal 74. The inhibit logic 58, preferably comprising programmable array logic, is designed to generate the inhibit signal 59 (e.g. INHIBIT=TRUE), and therefore prevent the outputting of the latched sum signal 50 (for both luminance and chrominance) at that time, when the line count signal 57 represents values of 3, 4, 37 and 38 (and no vertical blanking is taking place).

Thus, the dynamic changing of the multiplying coefficients 30, 32, 34, 36, according to the address signal 68 and in conjunction with the selectively inhibited action of the second latch 52 and FIFO 54, causes the interleaved component version 24 of the input SMPTE D2 signal 18 to be converted to an SMPTE D1 output signal 55.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A video sample rate converter for receiving an input interleaved digital component video signal having a first sample rate and providing an output interleaved digital component video signal having a second sample rate, wherein said second sample rate is lower than said first sample rate, said video sample rate converter comprising:

multi-tap finite impulse response digital filter means for receiving a plurality of parallel, time variant filter coefficient data signals, for receiving a first interleaved digital component video signal having a first sample rate and for providing a second interleaved digital component video signal in accordance with said received plurality of time variant filter coefficient data signals, wherein said second interleaved digital component video signal includes substantially duplicative and non-duplicative video data; and output means coupled to said multi-tap finite impulse response digital filter means for receiving said second interleaved digital component video signal and selectively outputting a filtered data signal having a second sample rate and representing said non-duplicative video data, wherein said second sample rate is lower than said first sample rate.

2. A video sample rate converter as recited in claim 1, wherein said multi-tap finite impulse response digital filter means comprises a plurality of serially coupled time delay elements with at least two unit time delay elements between each one of said multiple taps.

3. A video sample rate converter as recited in claim 1, further comprising filter coefficient data source means for sourcing said plurality of time variant filter coefficient data signals.

4. A video sample rate converter as recited in claim 1, wherein said output means comprises a plurality of serially coupled data storage elements for receiving a plurality of output clock signals, for receiving and selectively, sequentially storing and transferring said second interleaved digital component video signal according to said received plurality of output clock signals, and for providing said filtered data signal.

5. A video sample rate converter as recited in claim 1, wherein said multi-tap finite impulse response digital filter means functions alternatively as a multi-point polyphase interpolator and as a data selector and multi-point linear interpolator in accordance with said received plurality of time variant filter coefficient data signals.

6. A video sample rate converter as recited in claim 2, wherein said multi-tap finite impulse response digital filter means further comprises a plurality of multipliers for receiving and multiplying a plurality of tapped data signals from said multiple taps with said received plurality of time variant filter coefficient data signals, wherein each one of said received plurality of tapped data signals is multiplied by one of said received plurality of time variant filter coefficient data signals to produce a plurality of multiplied data signals.

7. A video sample rate converter as recited in claim 6, wherein said multi-tap finite impulse response digital filter means further comprises an adder for receiving and adding said plurality of multiplied data signals, and for providing said second interleaved digital component video signal.

8. A video sample rate converter as recited in claim 3, wherein said filter coefficient data source means comprises a plurality of memory circuits for storing a plurality of filter coefficient data, for receiving a time variant coefficient address signal, and for selectively providing said plurality of time variant filter coefficient data signals in accordance with said stored plurality of filter coefficient data and said received time variant coefficient address signal.

9. An interleaved data rate converter for receiving and converting the data rate of a plurality of serially interleaved data from a first data rate to a second data rate, said interleaved data rate converter comprising:

a plurality of serially coupled data storage elements including a first data storage element for receiving a plurality of serially interleaved data having a first data rate, wherein said received plurality of serially interleaved data is sequentially stored and transferred by each successive one of said plurality of serially coupled data storage elements through a last data storage element;

a plurality of data taps coupled between a plurality of preselected ones of said plurality of serially coupled data storage elements for providing a plurality of tapped data;

a plurality of multipliers coupled to said plurality of data taps for receiving said plurality of tapped data, for receiving a plurality of parallel, time variant coefficient data, and for multiplying said received pluralities of tapped and time variant coefficient data; and an adder coupled to said plurality of multipliers for receiving and adding said multiplied pluralities of tapped and time variant coefficient data.

10. An interleaved data rate converter as recited in claim 9, further comprising a data sampler coupled to said adder for receiving and selectively sampling said added, multiplied pluralities of tapped and time variant coefficient data, and for providing a plurality of serially interleaved data having a second data rate.

11. An interleaved data rate converter as recited in claim 9, further comprising a plurality of memory circuits for storing a plurality of coefficient data, for receiving a time variant coefficient address signal and for selectively providing said plurality of time variant coefficient data in accordance with said received time variant coefficient address signal.

12. A video sample rate conversion method for receiving an input interleaved digital component video signal having a first sample rate and providing an output interleaved digital component video signal having a second sample rate, wherein said second sample rate is lower than said first sample rate, said video sample rate conversion method comprising the steps of:

receiving a plurality of parallel, time variant filter coefficient data signals;

receiving a first interleaved digital component video signal having a first sample rate;

generating a second interleaved digital component video signal in accordance with said received plurality of time variant filter coefficient data signals, wherein said second interleaved digital component video signal includes substantially duplicative and non-duplicative video data;

receiving said generated second interleaved digital component video signal; and selectively outputting a filtered data signal having a second sample rate and representing said non-duplicative video data, wherein said second sample rate is lower than said first sampler rate.

13. A video sample rate conversion method as recited in claim 12, further comprising the steps of:
storing a plurality of filter coefficient data;
receiving a time variant coefficient address signal; and
providing said plurality of time variant filter coefficient data signals by selectively outputting said stored plurality of filter coefficient data in accordance with said received time variant coefficient address signal.

14. A video sample rate conversion method as recited in claim 12, wherein said step of generating a second interleaved digital component video signal in accordance with said received plurality of time variant filter coefficient data signals comprises the alternating steps of multi-point polyphase interpolating and selectively multi-point linearly interpolating said received, generated second interleaved digital component video signal in accordance with said received plurality of time variant filter coefficient data signals.

15. An interleaved data rate conversion method for converting the data rate of a plurality of serially interleaved data from a first data rate to a second data rate, said interleaved data rate conversion method comprising the steps of:
receiving a plurality of serially interleaved data having a first data rate;
sequentially storing and transferring said received plurality of serially interleaved data;
tapping off a plurality of said sequentially stored and transferred data;
receiving a plurality of parallel, time variant coefficient data;
multiplying said pluralities of tapped and received time variant coefficient data; and
adding said multiplied pluralities of tapped and received time variant coefficient data.

16. An interleaved data rate conversion method as recited in claim 15, further comprising the steps of:
selectively sampling said added, multiplied pluralities of tapped and received time variant coefficient data; and
providing a plurality of serially interleaved data having a second data rate.

17. An interleaved data rate conversion method as recited in claim 15, further comprising the steps of:
storing a plurality of filter coefficient data;
receiving a time variant coefficient address signal; and
providing said plurality of time variant filter coefficient data by selectively outputting said stored plurality of filter coefficient data in accordance with said received time variant coefficient address signal.

18. An interleaved data rate conversion method as recited in claim 15, wherein said step of multiplying said pluralities of tapped and received time variant coefficient data comprises the alternating steps of multi-point polyphase interpolating and selectively multi-point linearly interpolating said pluralities of tapped data in accordance with said received plurality of time variant filter coefficient data.

19. A video sample rate converter for receiving an input interleaved digital component video signal having a first sample rate and providing an output interleaved digital component video signal having a second sample rate, wherein said second sample rate is lower than said first sample rate, said video sample rate converter comprising:
multi-tap finite impulse response digital filter means for receiving a plurality of time variant filter coefficient data signals, for receiving a first interleaved digital component video signal having a first sample rate and for providing a second interleaved digital component video signal in accordance with said received plurality of time variant filter coefficient data signals, wherein said second interleaved digital component video signal includes substantially duplicative and non-duplicative video data; and
output means coupled to said multi-tap finite impulse response digital filter means for receiving said second interleaved digital component video signal and selectively outputting a filtered data signal having a second sample rate and representing said non-duplicative video data, wherein said second sample rate is lower than said first sample rate;
wherein said output means comprises:
a plurality of serially coupled data storage elements for receiving a plurality of output clock signals, for receiving and selectively, sequentially storing and transferring said second interleaved digital component video signal according to said received plurality of output clock signals, and for providing said filtered data signal; and
clock generator means for receiving an input clock signal and for providing said plurality of output clock signals, wherein said plurality of output clock signals comprises a periodic clock signal and a selectively aperiodic clock signal.

20. A video sample rate converter as recited in claim 19, wherein said clock generator means comprises a selective pulse swallower for receiving said input clock signal and providing said selectively aperiodic clock signal.

21. An interleaved data rate converter for receiving and converting the data rate of a plurality of serially interleaved data from a first data rate to a second data rate, said interleaved data rate converter comprising:
a first plurality of serially coupled data storage elements including a first data storage element for receiving a plurality of serially interleaved data having a first data rate, wherein said received plurality of serially interleaved data is sequentially stored and transferred by each successive one of said plurality of serially coupled data storage elements through a last data storage element;
a plurality of data taps coupled between a plurality of preselected ones of said plurality of serially coupled data storage elements for providing a plurality of tapped data;

a plurality of multipliers coupled to said plurality of data taps for receiving said plurality of tapped data, for receiving a plurality of time variant coefficient data, and for multiplying said received pluralities of tapped and time variant coefficient data; and an adder coupled to said plurality of multipliers for receiving and adding said multiplied pluralities of tapped and time variant coefficient data to provide added data;

a second plurality of serially coupled data storage elements coupled to said adder for receiving a plurality of output clock signals, for receiving and selectively, sequentially storing and transferring said added data according to said received plurality of output clock signals, and for providing output data having a second data rate, wherein said second data rate is lower than said first data rate; and a clock signal generator coupled to said second plurality of serially coupled data storage elements for receiving an input clock signal and for providing said plurality of output clock signals, wherein said plurality of output clock signals comprises a periodic clock signal and a selectively aperiodic clock signal.

22. A video sample rate conversion method for receiving an input interleaved digital component video signal having a first sample rate and providing an output interleaved digital component video signal having a second sampler ate, wherein said second sample rate is lower than said first sample rate, said video sample rate conversion method comprising the steps of:

receiving a plurality of time variant filter coefficient data signals;

receiving a first interleaved digital component video signal having a first sample rate;

generating a second interleaved digital component video signal in accordance with said received plurality of time variant filter coefficient data signals, wherein said second interleaved digital component video signal includes substantially duplicative and non-duplicative video data;

generating a plurality of output clock signals, wherein said plurality of output clock signals comprises a periodic clock signal and a selectively aperiodic clock signal; and receiving and selectively, sequentially storing and transferring said generated second interleaved digital component video signal according to said generated plurality of output clock signals for outputting as a filtered data signal having a second sample rate and representing said non-duplicative video data, wherein said second sample rate is lower than said first sample rate.

23. An interleaved data rate conversion method for converting the data rate of a plurality of serially interleaved data from a first data rate to a second data rate, said interleaved data rate conversion method comprising the steps of:

receiving a plurality of serially interleaved data having a first data rate;

sequentially storing and transferring said received plurality of serially interleaved data;

tapping off a plurality of said sequentially stored and transferred data;

receiving a plurality of time variant coefficient data;

multiplying said pluralities of tapped and received time variant coefficient data;

adding said multiplied pluralities of tapped and received time variant coefficient data to provide added data;

generating a plurality of output clock signals, wherein said plurality of output clock signals comprises a periodic clock signal and a selectively aperiodic clock signal; and receiving and selectively, sequentially storing and transferring said added data according to said generated plurality of output clock signals for outputting as output data having a second data rate, wherein said second data rate is lower than said first data rate.

* * * * *